(12) United States Patent
Smithson et al.

(10) Patent No.: US 6,446,899 B1
(45) Date of Patent: *Sep. 10, 2002

(54) SEAT BELT RETRACTOR

(75) Inventors: Alan George Smithson, Carlisle (GB);
David Blackadder, Carlisle (GB);
Joseph Patrick Harte, Maryport (GB);
John Alexander Taylor, Penrith (GB);
Paul Bowman, Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 86 days.

This patent is subject to a terminal disclaimer.

(21) Appl. No.: 09/640,241

(22) Filed: Aug. 16, 2000

(30) Foreign Application Priority Data

Sep. 17, 1999 (GB) ................................. 9922107

(51) Int. Cl.[7] ............................................... B60R 22/28
(52) U.S. Cl. ..................................... 242/379.1; 280/805
(58) Field of Search ...................... 242/379.1; 280/805; 297/472

(56) References Cited

U.S. PATENT DOCUMENTS

| 3,941,330 | A | 3/1976 | Ulrich ..................... 242/107.4 |
| 4,619,418 | A | 10/1986 | Butenop ............... 242/107.4 A |
| 4,674,700 | A | 6/1987 | Andersson ........... 242/107.4 R |
| 5,524,833 | A | 6/1996 | Modinger et al. .......... 242/379 |

FOREIGN PATENT DOCUMENTS

| DE | 3421960 | 12/1985 |
| EP | 0112033 B1 | 11/1986 |
| GB | 2254774 | 10/1992 |
| GB | 2265300 | 9/1993 |
| WO | WO8502152 | 5/1985 |
| WO | WO8908570 | 9/1989 |

*Primary Examiner*—John Q. Nguyen
(74) *Attorney, Agent, or Firm*—Lonnie Drayer; Jarett Rieger

(57) ABSTRACT

A seat belt retractor has a frame with sidewalls and a rotatable spool extending between said sidewalls. The rotatable spool has seat belt webbing wound thereon. A locking pawl engages ratchet teeth on the outer periphery of the spool for arresting rotation of the spool. A secondary locking mechanism locks the spool against rotation.

2 Claims, 8 Drawing Sheets

SEAT BELT RETRACTOR

FIELD OF THE INVENTION

The present invention relates to a locking mechanism for a seat belt retractor.

BACKGROUND OF THE INVENTION

A seat belt retractor typically comprises a spool on which seat belt webbing is wound and which rotates about its longitudinal axis to pay out or wind in webbing as required by movement of the vehicle occupant. In the event of a crash, the spool is locked against rotation and thus pay out is prevented and the vehicle occupant is securely restrained against forward motion.

The spool is locked by engagement of ratchet teeth at its ends, with toothed pawls mounted on a lockbar extending across the width of the spool.

The lockbar is under considerable strain during a crash and must be constructed to be very strong. Typically the teeth on the locking pawls may shear under particularly high crash forces.

SUMMARY OF THE INVENTION

There is provided in accordance with the present invention a seat belt retractor comprising a retractor frame with side walls and a rotatable spool extending between said side walls, said rotatable spool having seat belt webbing wound thereon, a primary locking mechanism comprises a locking pawl for engaging with ratchet teeth on the outer periphery of the spool for arresting rotation of the spool, and a secondary locking mechanism for locking the spool against rotation.

According to a first embodiment of the invention, the secondary locking mechanism comprises a set of teeth formed in a detent that is offset from the plane of the retractor frame side walls and arranged to co-operate with a smooth surfaced spool ratchet flange to lock the spool against rotation.

According to a second embodiment of the invention the secondary locking mechanism comprises an inner frame comprising two circular ring portions and a joining portion, and a set of teeth is formed on the inside surface of each ring and arranged to engage the spool ratchet flange to lock the spool against rotation.

According to a third embodiment, secondary locking teeth are mounted on a bar fixed to the frame sidewalls across the open side of the retractor frame. This bar may be formed as an extension of the tie plate, which holds the sides of the frame together.

According to a fourth embodiment, the secondary locking teeth are mounted on a secondary locking pawl, which is pivotably mounted on a locking pawl support bar.

DETAILED DESCRIPTION OF THE INVENTION

Figure 1:
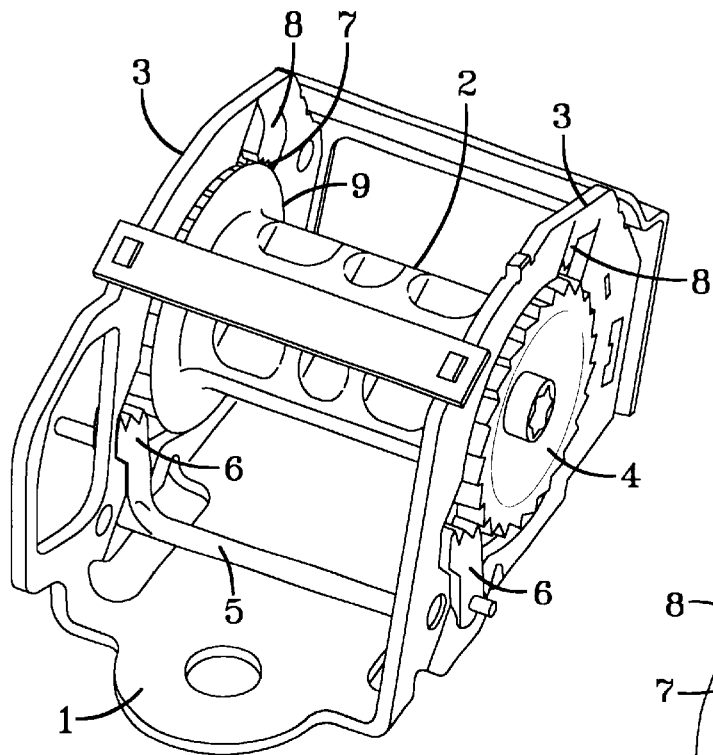
FIG. 1 is an isometric view of a seat belt retractor according to a first embodiment of the invention.

In the figures like parts are referenced accordingly. FIG. 1 shows the seat belt retractor in perspective, FIG. 2 a cross-sectional side view and FIG. 3 in longitudinal cross-section. A seat belt retractor comprises a U-shaped frame 1 with a spool 2 mounted for rotation between the sidewalls 3 of the frame. The ends of the spool 2 are formed as toothed ratchet wheels 4. A lockbar 5 has toothed pawls 6 fixed to each end and pivots in the event of a crash to engage the teeth on the pawls 6 with the teeth on the ratchet wheels 4 to lock the spool against further rotation and thus against payout of the webbing to restrain a vehicle occupant.

According to a first embodiment of the invention, the secondary locking mechanism comprises a set of teeth formed in a detent that is offset from the plane of the retractor frame side walls and arranged to co-operate with a smooth surfaced spool ratchet flange to lock the spool against rotation. On engagement of the primary locking mechanism, the frame side walls deform and the set of teeth in the detent are pushed closer to, and under high loads against, the ratchet wheel flange. This set of teeth digs into the flange and prevents rotation of the spool. The detent is preferably arranged diametrically opposite the pivot point of the primary locking pawl.

Figure 2:
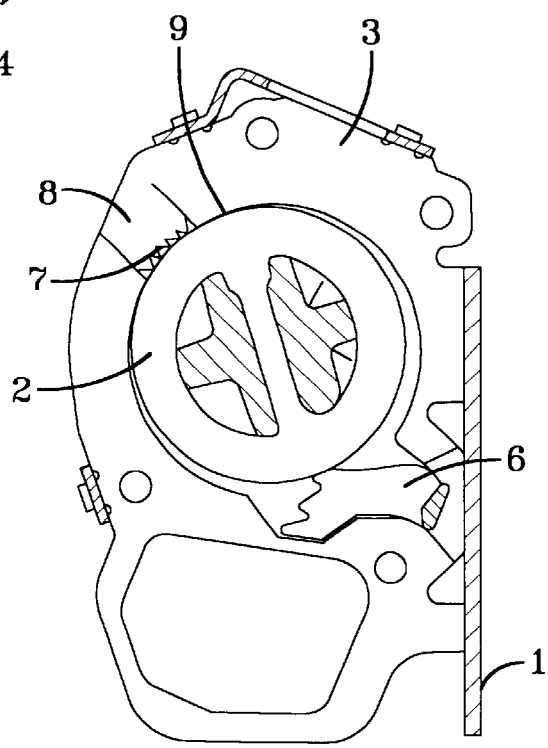
FIG. 2 is a cross-sectional side view of the seat belt retractor of FIG. 1.
Figure 3:
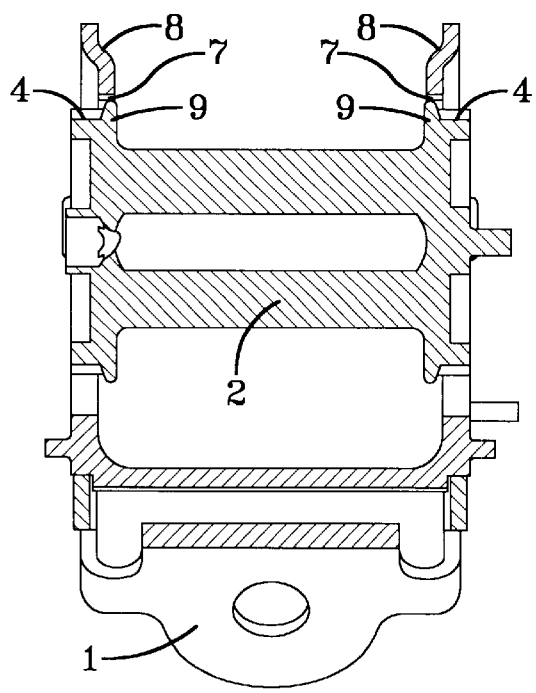
FIG. 3 is a cross-sectional view of the seat belt retractor of FIGS. 1 and 2.
Figure 4:
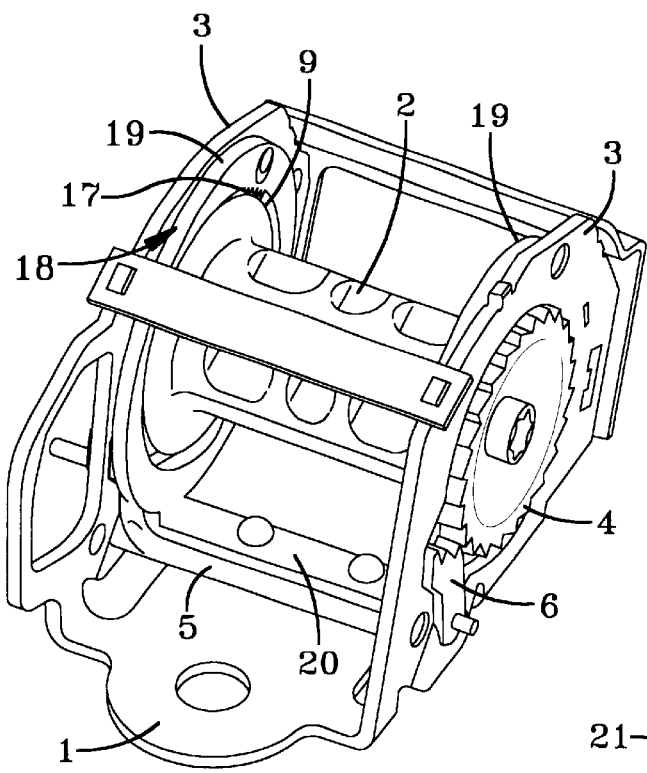
FIG. 4 is an isometric view of a seat belt retractor according to a second embodiment of the invention.
Figure 5:
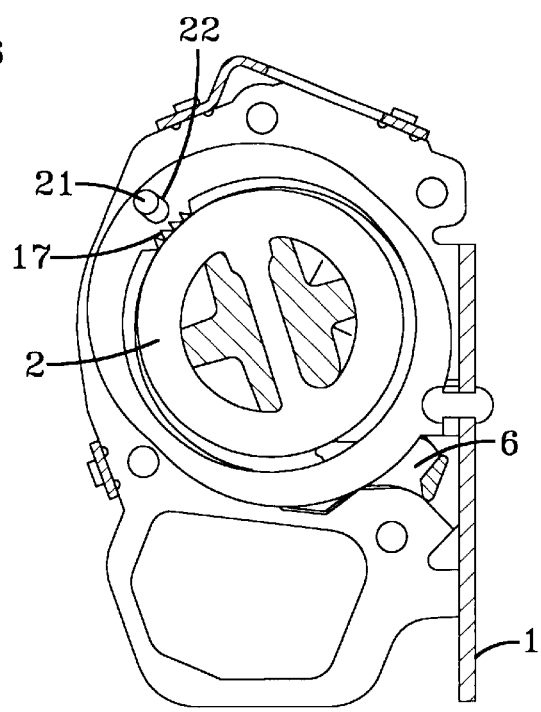
FIG. 5 is a cross-sectional side view of the seat belt retractor of FIG. 4.
Figure 6:
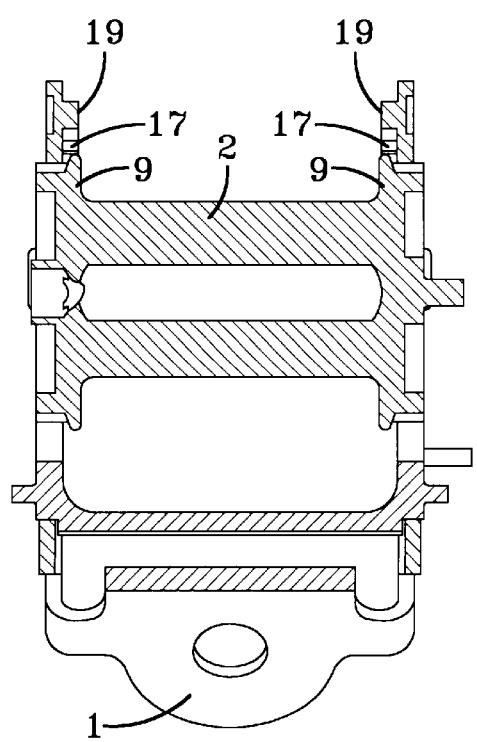
FIG. 6 is a cross-sectional view of the seat belt retractor of FIGS. 4 and 5.
Figure 7:
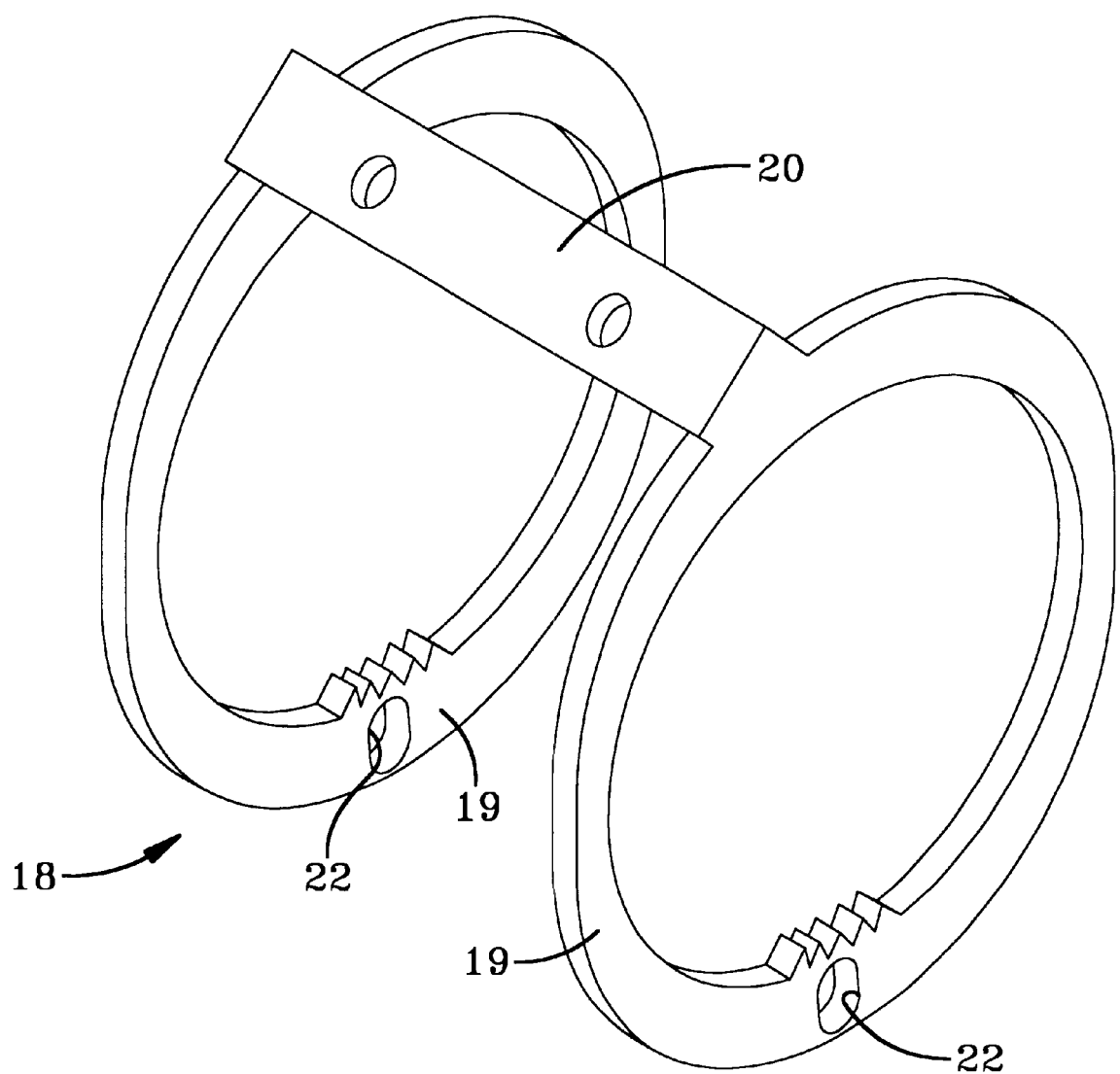
FIG. 7 is an isometric view of a part of the seat belt retractor of FIGS. 4 to 6.

In FIGS. 1 to 3, a secondary locking mechanism is shown comprising teeth 7 projecting towards the spool from detents 8 in the frame 1, offset from the planes of the side walls 3 of the frame. The teeth 7 are in the plane of a spool ratchet wheel flange 9. This is a smooth surface adjacent the teeth on the ratchet wheel 4.

In operation, after a crash is detected the primary pawls 6 pivot and engage the respective ratchet wheels 4 to lock the spool 2 against rotation. As the crash force increases, the lockbar 5, G forces the spool 2 and the flange 9 into engagement with the secondary locking teeth 7 which dig into the flange 9 and thus providing a secondary locking for the spool.

According to a second embodiment of the invention the secondary locking mechanism comprises an inner frame comprising two circular ring portions and a joining portion, and a set of teeth is formed on the inside surface of each ring and arranged to engage the spool ratchet flange to lock the spool against rotation. Preferably the joining portion is bolted to the retractor frame. In FIGS. 4 to 7 a second embodiment is shown in which secondary locking teeth 17 project radially inward from rings in an additional frame member 18. The additional frame member 18 comprises two rings 19 connected by a bar 20 which is bolted to the retractor frame 1.

The support bar may be arranged to respond to movement of the primary locking pawl. Thus the support bar may be mounted to the frame via slots, and a rear extension portion arranged on the primary pawl to engage the support bar when the primary pawl moves into locking position. The rear extension portion moves the bar and thus pivots the secondary locking pawl into engagement with the spool ratchet teeth. The secondary locking teeth 17 engage the smooth outer surface of the spool ratchet wheel flange 9 to perform the secondary locking. The rings 19 of the additional frame piece 18 are connected to the sidewalls 3 of the frame 1 by pegs 21 on the sidewalls 3, which can slide in slots 22 in the rings 19. In operation, after the primary pawl 6 has engaged, further crash forces cause distortion of the frame side walls 3 which in turn pushes the secondary locking teeth into engagement with the ratchet wheel flange 9. The additional frame member is seen more clearly in FIG. 7.

Figure 8:
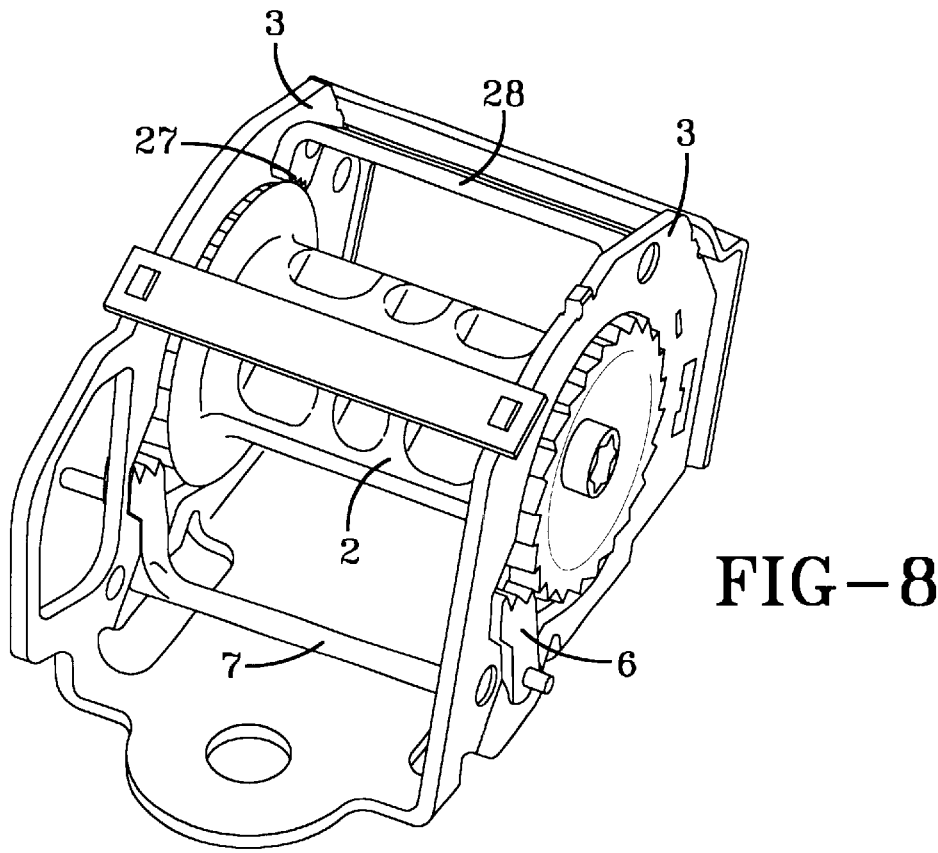
FIG. 8 is an isometric view of a seat belt retractor according to a third embodiment of the invention.
Figure 9:
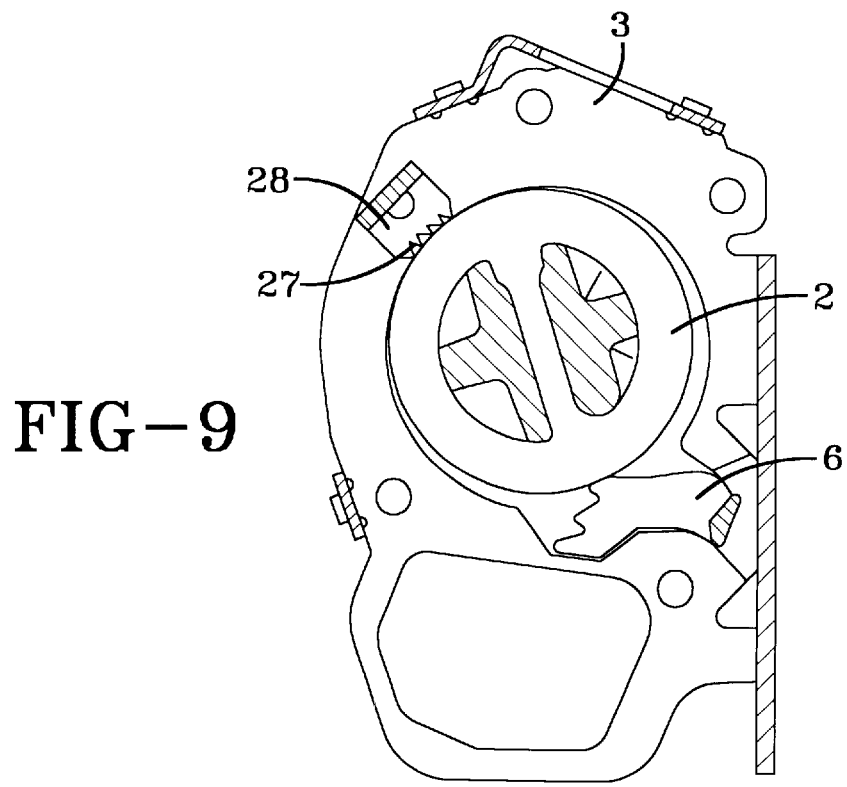
FIG. 9 is a cross-sectional side view of the seat belt retractor of FIG. 8.
Figure 10:
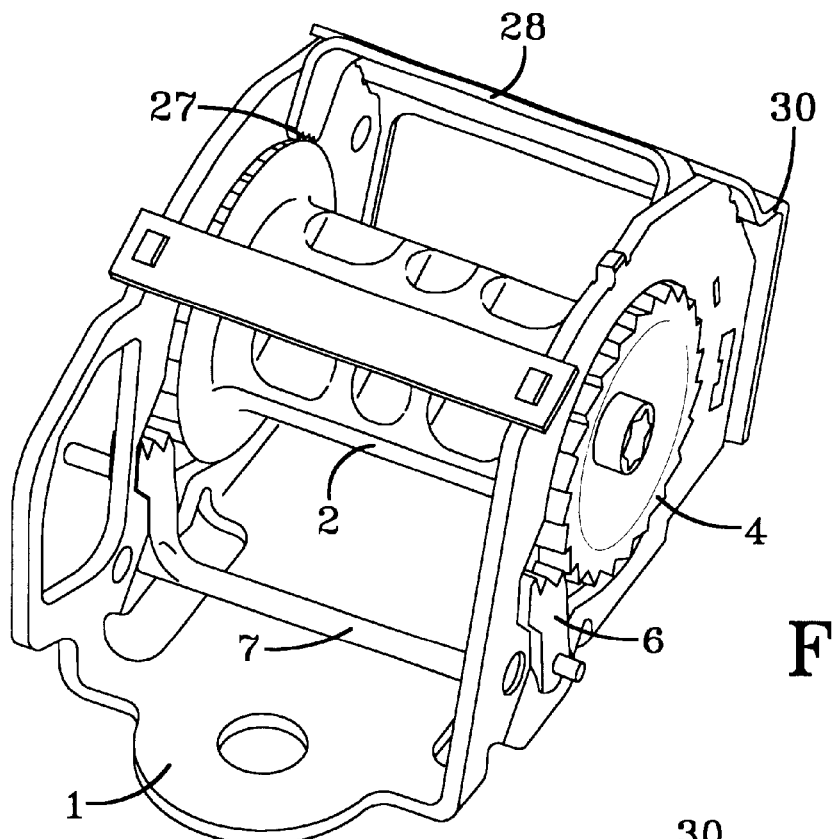
FIG. 10 is an isometric view of another version of a seat belt retractor according to the third embodiment of the invention.
Figure 11:
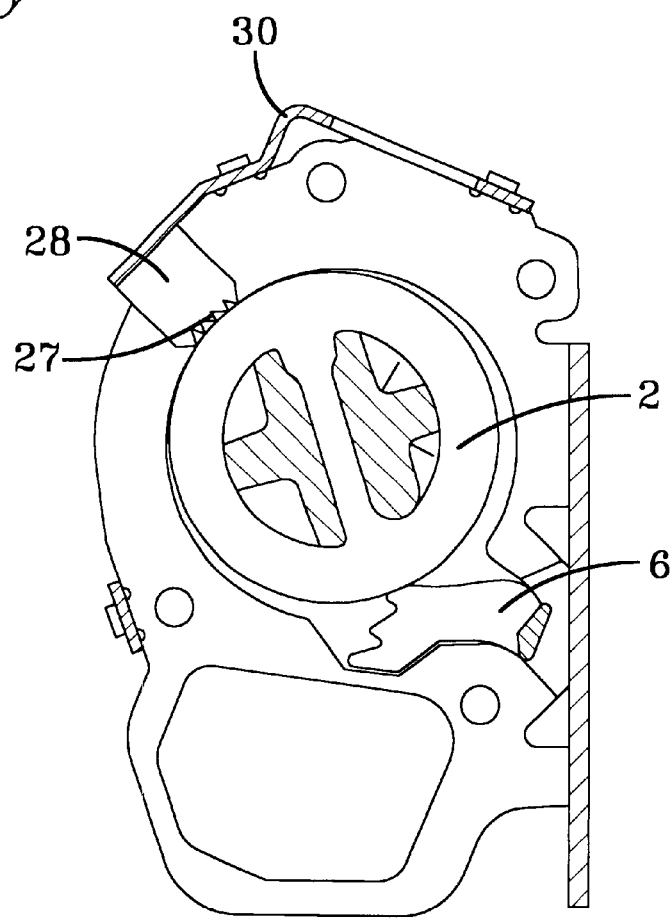
FIG. 11 is a cross-sectional side view of the seat belt retractor of FIG. 10.

According to a third embodiment, secondary locking teeth are mounted on a bar fixed to the frame sidewalls across the open side of the retractor frame. This bar may be formed as an extension of the tie plate, which holds the sides of the frame together. In FIGS. 8 and 9 the secondary locking mechanism is provided by secondary locking teeth 27 on a bar 28 fixed across the gap between the frame side walls 3. In FIGS. 10 and 11 the bar 28 is part of tie bars 30.

According to a fourth embodiment, the secondary locking teeth are mounted on a secondary locking pawl, which is pivotably mounted on a locking pawl support bar. This arrangement may be single sided or double sided, i.e. two secondary pawls may be provided, on each side of the spool. The support bar may be arranged such that as the frame deforms under high loads, the secondary pawl pivots into engagement with the ratchet teeth on the spool.

In the embodiment of FIGS. 12 to 17, the secondary locking mechanism is provided by a secondary locking pawl 38 having teeth 37 arranged to engage the teeth on the spool ratchet 4. The secondary locking pawl 38 is pivotally mounted to a pawl support bar 39 via a pin 40 extending from the pawl 38 and a hole 41 at the end of the support bar 39. In the embodiment of FIGS. 12 to 15, the support bar 39 is fixed to the back of the frame by rivets 42. In operation, under crash conditions the primary locking pawl 6 engages with the ratchet 4 on the spool 2 and prevents the spool rotating. As crash forces increase the frame 1 deforms and the support bar 39, relative to the frame 1, moves causing secondary locking pawl 38 to pivot into engagement with the ratchet 4 and more securely lock the spool 2.

Figure 12:
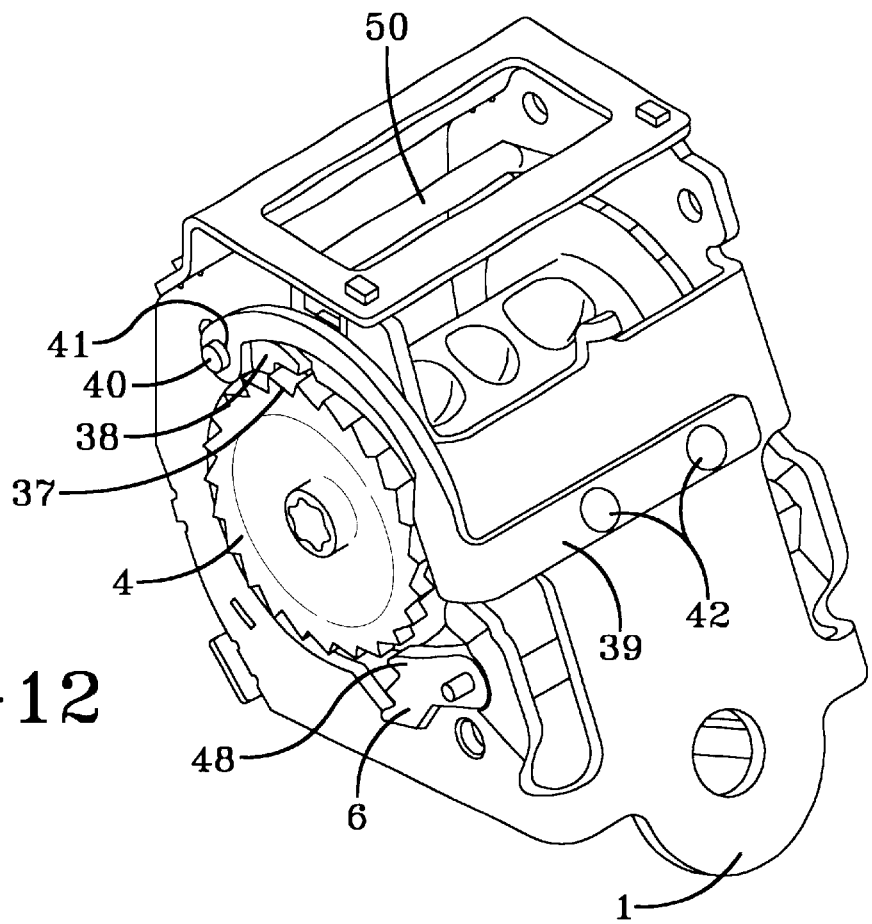
FIG. 12 is an isometric view of a seat belt retractor according to a fourth embodiment of the invention.
Figure 13:
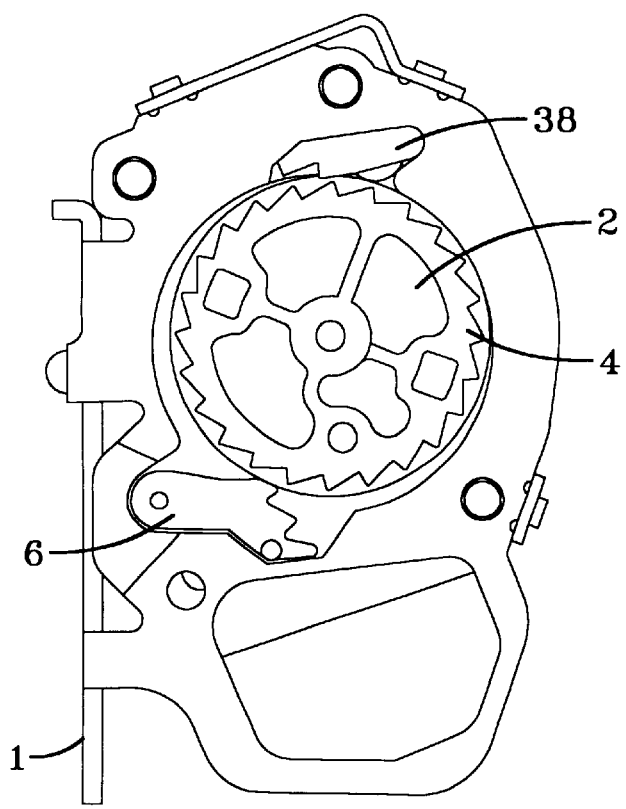
FIG. 13 is a side view of the seat belt retractor of FIG. 12.

In FIGS. 12 and 13, the pawl support bar 39 extends only one side of the retractor frame 1. A secondary locking pawl 38 is nonetheless provided on both sides and they are connected by means of a rod 50. Alternatively, a single secondary locking pawl may be used and the rod is omitted.

Figure 14:
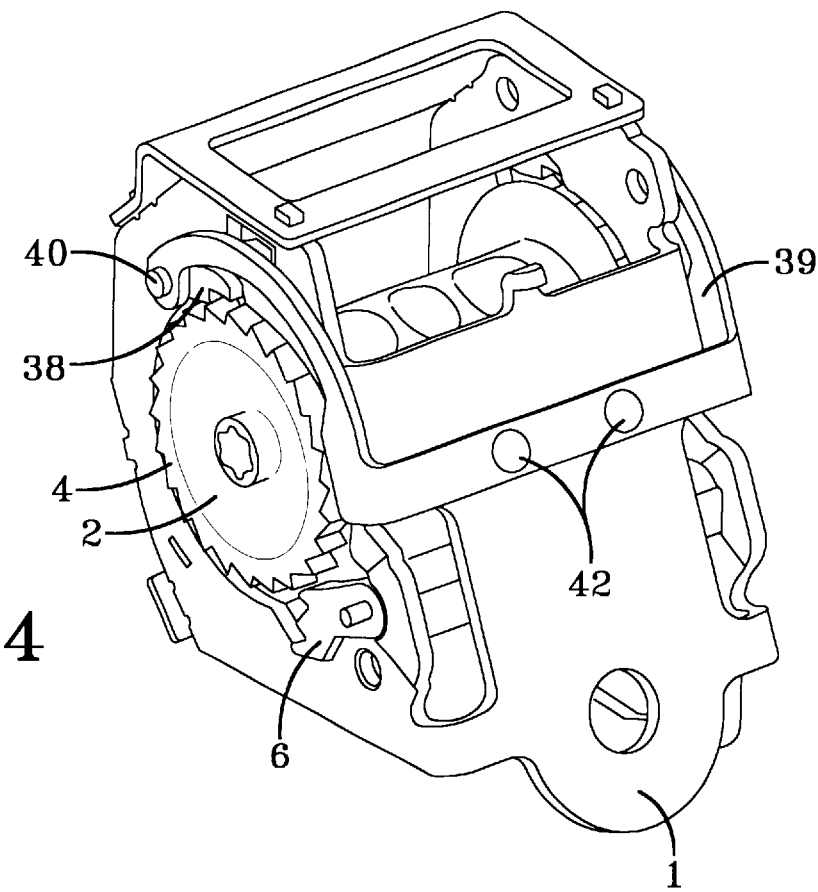
FIG. 14 is an isometric view of a seat belt retractor according to a first modification of the fourth embodiment of the invention.
Figure 15:
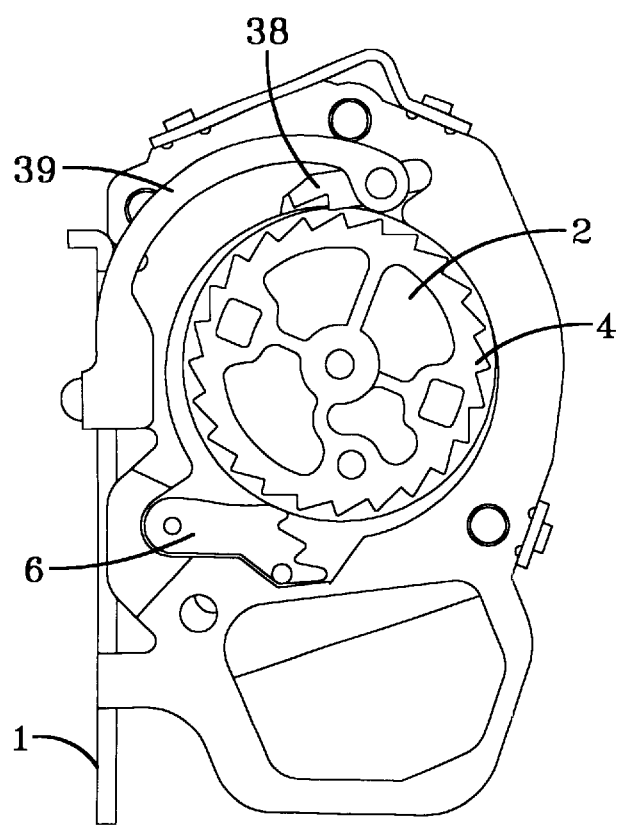
FIG. 15 is a side view of the seat belt retractor of FIG. 14.

In FIGS. 14 and 15, the support bar 39 extends to both sides of the frame 1 and supports the two secondary pawls 38, one on each side of the frame 1. The difference between the single sided support bar modification, and the double-sided version, is clearly seen from a comparison of FIGS. 13 and 15.

Figure 16:
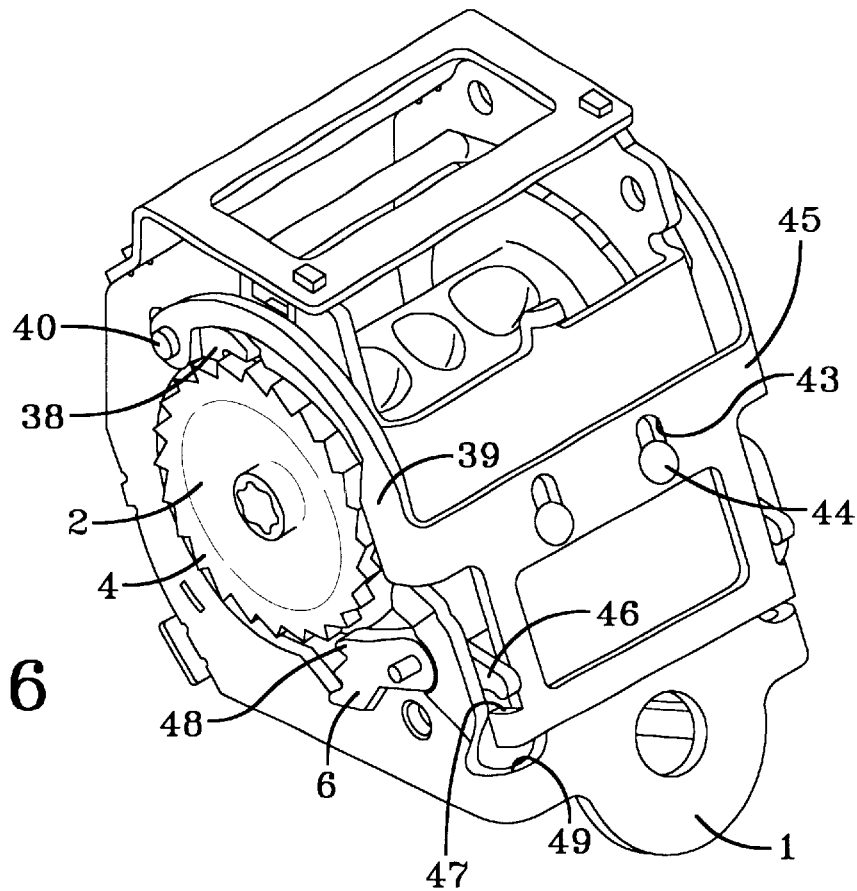
FIG. 16 is an isometric view of a seat belt retractor according to a second modification of the fourth embodiment of the invention.
Figure 17:
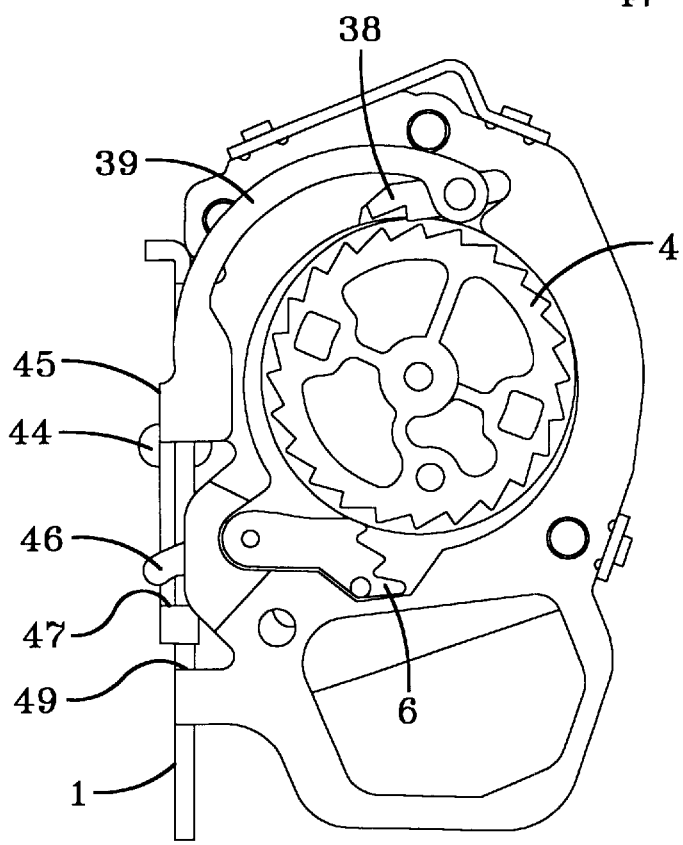
FIG. 17 is a side view of the seat belt retractor of FIG. 16.

In the embodiment of FIGS. 16 and 17, the secondary pawl support bar 39 is integral with an actuator part 45, and instead of being fixed to the frame 1 it is mounted to be slidable relative thereto. To this end slots 43 are provided in the actuator 45 which engage bolts 44 and allows a vertical sliding motion of the actuator 45 relative to the frame 1.

The primary locking pawl 6 has a tail part 46, which extends through a cutout in the back of the frame 1 and contacts a cam surface 47 of the actuator 45.

In operation of this modification, the primary locking pawl 6 pivots in a crash situation and its leading tooth 48 engages the ratchet wheel 4 and halts rotation of spool 2. The spacing of the teeth on the ratchet 4 and on the pawl 6 is such that at this stage of operation only the leading tooth 48 engages.

As the crash forces increase, the frame 1 distorts and the pawl 6 is pivoted further to bring the other teeth into engagement with the ratchet 4. As the pawl 6 rotates upwards, its tail part 46 rotates downwards and pushes the actuator 45 downwards. This pulls the support bar 39 downwards and hence causes secondary pawl 38 to pivot down into engagement with the teeth on ratchet 4. Hence the spool 2 is more securely locked against rotation and the high loads are shared between the pawls.

The length of the slots 43 is chosen to limit the extent of movement if the actuator 45 to that needed for full engagement of the secondary locking pawl 38.

One or more stops are preferably provided on the retractor frame to limit the extent of movement of the support bar to the amount needed to engage the secondary pawl with the ratchet teeth. A stop 49 is provided on the frame 1 against which the actuator 45 rests when full engagement of the secondary pawl 38 has occurred to limit the movement of the actuator 45.

The invention is not confined to the particular construction and arrangement of parts herein illustrated and described, but embraces such modified forms thereof as come within the scope of the following claims.

We claim:

1. A seat belt retractor comprising a retractor frame with side walls, a rotatable spool extending between said side walls, said rotatable spool having seat belt webbing wound thereon, a primary locking mechanism comprises a locking pawl for engaging with ratchet teeth on the outer periphery of the spool for arresting rotation of the spool, and a secondary locking mechanism for locking the spool against rotation, the secondary locking mechanism comprises a set of teeth formed in a detent that is offset from the plane of the retractor frame walls which is adapted so that above a predetermined load the teeth in said detent engage with a smooth surfaced spool ratchet flange positioned adjacent to a set of teeth on the ratchet wheel.

2. The seat belt retractor according to claim 1 wherein the detent is located diametrically opposite the pivot point of the primary locking pawl.

* * * * *